US 6,585,164 B1

(12) United States Patent
Cooreman et al.

(10) Patent No.: US 6,585,164 B1
(45) Date of Patent: Jul. 1, 2003

(54) ASYNCHRONOUS MEMORY CARD

(75) Inventors: Pascal Cooreman, Marseille (FR);
Stephane Rayon, La Ciotat (FR);
Bertrand Gomez, Roquevaire (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/601,120

(22) PCT Filed: Jan. 15, 1999

(86) PCT No.: PCT/FR99/00062

§ 371 (c)(1),
(2), (4) Date: Jul. 27, 2000

(87) PCT Pub. No.: WO99/38130

PCT Pub. Date: Jul. 29, 1999

(30) Foreign Application Priority Data

Jan. 27, 1998 (FR) .............................. 98 00859

(51) Int. Cl.⁷ ............................................... G06K 19/06
(52) U.S. Cl. ........................................ 235/492; 235/487
(58) Field of Search ................................. 235/487, 492, 235/451, 383; 710/62, 74, 13, 8

(56) References Cited

U.S. PATENT DOCUMENTS

| | | | | |
|---|---|---|---|---|
| 5,260,555 A | * | 11/1993 | Sakamoto | 235/492 |
| 5,339,402 A | * | 8/1994 | Ueda | 395/425 |
| 5,442,704 A | * | 8/1995 | Holtey | 380/23 |
| 5,729,004 A | * | 3/1998 | Kim et al. | 235/492 |
| 5,942,738 A | * | 8/1999 | Cesaire et al. | 235/380 |
| 6,098,888 A | * | 8/2000 | Praden | 235/492 |

FOREIGN PATENT DOCUMENTS

| | | |
|---|---|---|
| EP | 0559205 A1 | 9/1993 |
| FR | 2684466 | 6/1903 |
| FR | 2635598 | 2/1990 |
| WO | WO96/38804 | 12/1996 |

\* cited by examiner

*Primary Examiner*—Thien M. Le
*Assistant Examiner*—April Nowlin
(74) *Attorney, Agent, or Firm*—Burns, Doane, Swecker & Mathis, L.L.P.

(57) ABSTRACT

A memory card fitted with contacts contains a memory and its access circuits. The memory access circuits are modified to allow recording or reading the memory via electric signals supplied by a terminal according to an asynchronous-type communication protocol with integrity check of the codes transmitted. The signals received on the contacts are analysed by an analysis circuit, then switched to address and data registers by a switch circuit. The analysis circuit and a control circuit transmit messages and codes to the terminal via a transmission circuit.

8 Claims, 1 Drawing Sheet

ASYNCHRONOUS MEMORY CARD

This disclosure is based upon, and claims priority from French Patent Application No. 98/00859, filed Jan. 27, 1998, and International Application No. PCT/FR99/00062, filed Jan. 15, 1999, the contents of which are incorporated herein by reference.

BACKGROUND OF THE INVENTION

The invention relates to smart cards, i.e. cards including essentially a memory as well as its addressing circuits for data or information recording and reading.

The memory of these cards is recorded and/or read using a terminal, such as a card reader, which communicates with the memory via electric signals applied through contacts. The electric signals are prepared by the terminal according to particular normative protocols whose main feature lies in the fact that they are indirect addressing synchronous protocols.

With such protocols, the transaction sequence is as follows:
- resetting the card, notably the memory address counter, either at power-up or via a reset signal on a dedicated pin;
- positioning the memory address counter at the right address by applying a determined plurality of pulses onto a pin corresponding to the clock pulses;
- a recording or reading command in the memory via a combination of signals applied on an Input/Output pin and on another pin which can be the reset pin, the clock pin or any other pin.

The shortcomings of such a smart card functioning according to such an operating mode are summed up hereinafter.

As the communication between a reader and a card, notably for a financial transaction, is sensitive to electric noises (voltage drop, faulty electric contacts, spurious pulses, etc., the accuracy of the message exchanged is not guaranteed.

This implies notably to repeat the communication one or several times in order to make sure that the transaction has been completed correctly.

Repeating the messages lengthens the time necessary to a transaction.

Moreover, it is possible to get faulty transactions further to the said electric noises.

Memory addressing is performed via a pulse counter which counts the series of pulses applied to the said counter and the code displayed by the counter at the end of the said series constitutes the address code of the memory. This so-called indirect addressing calls for a certain duration further to pulse counting and may be a source of error, for instance if a given pulse is not taken into account for various reasons.

Neither the data nor the command received are checked for integrity, hence a certain lack of security.

The transaction protocol is of synchronous type, which implies rigorous synchronism between the terminal and the smart card, a synchronism which is sometimes difficult to obtain and to maintain during the transaction because of external disturbances.

No acknowledgement of receipt is given when receiving the data or the command received.

Correct operation of the command is not checked.

SUMMARY OF THE INVENTION

An objective of the present invention is therefore to provide a smart card which does not exhibit the shortcomings afore mentioned.

This objective is satisfied by modifying the signals applied to the smart card as well as the access circuits to the card memory so that:
- communication between the terminal and the smart card is performed using an asynchronous communication protocol;
- memory addressing is direct addressing;
- the information received by the card and relating to an address, a command or a data, can be checked;
- the smart card returns an acknowledgement of receipt to the terminal, to confirm that the information was received in full;
- the smart card transmits to the terminal a piece of information stating that the command was executed correctly.

The invention relates to a contact smart card comprising a memory capable of working together with a terminal via access circuits comprising an addressing circuit and a control circuit, characterised in that the access circuits to the said memory further comprise:
- a circuit for receiving and analysing electric signals applied to the contacts of the smart card by the terminal, whereas the said reception and analysis circuit provides messages and codes;
- a circuit for interpreting and switching the codes supplied by the analysis circuit according to whether it is a memory address code, a data code or a control code;
- an address register which records the address code supplied by the interpretation and switch circuit to make it available to the addressing circuit;
- at least one data register which records the control code of the operation to be performed on the memory or the data code, possibly to be recorded therein, in order to make the said codes available to the control circuit with a view to performing the operation indicated by the control code,
- at least one output register which records the code read in the memory or the execution status code of the control, supplied by the control circuit, and
- a circuit for transmitting to the contacts, the codes supplied by the output register and messages supplied by the reception and analysis circuit in order to transmit them to the terminal.

The card according to the invention is advantageously, after a few minor improvements, in addition to the wired functions mentioned above, totally compatible with readers of the existing stock. In particular, it is especially advantageous to be able to use the microprocessor card readers, which is currently impossible with the present smart cards.

BRIEF DESCRIPTION OF THE DRAWING

The invention will be better understood when reading the following description of a peculiar embodiment, whereas the said description refers to the appended drawing in which the sole FIGURE is a block diagram of a smart card according to the invention.

DETAILED DESCRIPTION

Figure 1:
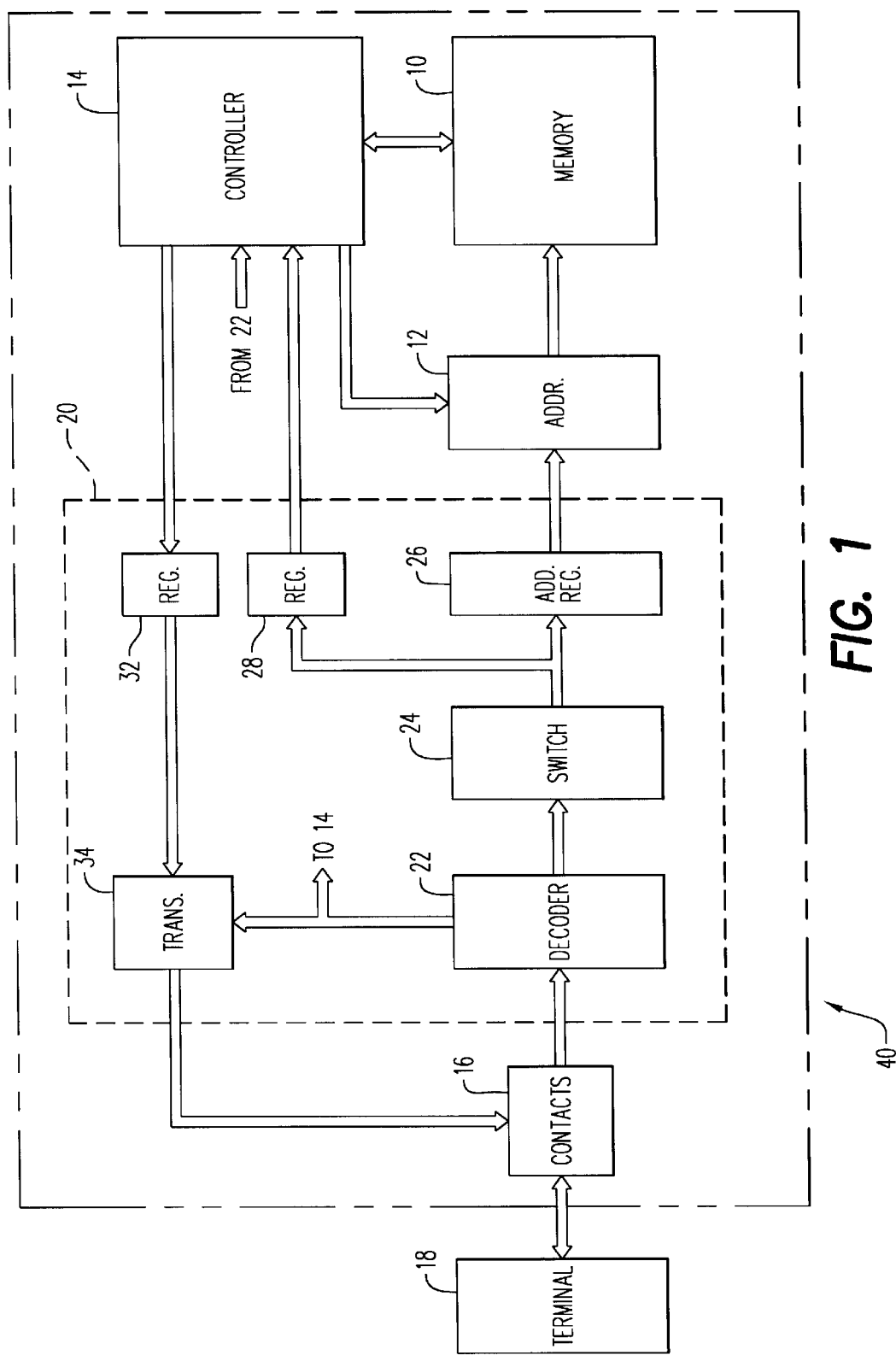

The smart card 40 comprises as already known:
- a memory 10 of the type enabling to read and to record data in the form of binary figures in elementary cells,
- an addressing circuit 12 of the memory 10 in order to select one or several groups of elementary cells, each corresponding to a data to be read or to be recorded, a control circuit 14 of the memory 10 and of the addressing circuit 12 to record or read the cells of the memory 10 at an address specified in the addressing circuit 12, and a plurality of contacts 16 arranged on one side of the card in order to establish the electric links between a terminal 18 and the smart card.

According to the invention, the smart card comprises, besides the elements indicated above, a device 20 which establishes the link between, on the one hand the plurality of contacts 16 and, on the other hand, the addressing circuit 12 and the control circuit 14.

This device 20 comprises:

a reception and analysis circuit 22 for the electric signals received on the contacts 16 in order to analyse the electric signals and to supply, on the one hand, messages to the terminal 18 and, on the other hand, codes which are representative of data, memory cell addresses and commands or instructions to be carried out, an interpretation and switch circuit 24 for the codes supplied by the reception and analysis circuit 22, an address register 26 to record the address code transmitted by the terminal and to make it available to the addressing circuit 12, at least one data register 28 to record the data code or the instruction code transmitted by the terminal and to make it available to the control circuit 14, at least one output register 32 in order to record the code read in the memory 10 or the execution status of the instruction, and a transmission circuit 34 for the code contained in the output register 32 to the terminal 18 via the contacts 16.

The link between the terminal 18 and the card 40 uses the plurality of contacts 16 while applying on the said contacts, electric signals which have been standardised according to so-called asynchronous communication protocols. These protocols can be of different known types and notably those known under the designation RS232 as regards a series link commonly used between a personal computer and its peripherals or the designations V22, V23, etc. as regards modem link.

The protocol selected is implemented by the terminal and must be understood by the smart card at the reception and analysis circuit 22.

The latter circuit 22 receives the electric signals from the terminal and analyses them to check their integrity.

To this end, the terminal is set up to add a redundant piece of information in the signals transmitted, information that the reception and analysis circuit 22 is able to check for availability and value. This may be the presence of a parity bit or of a redundant cyclic code. It should be noted that numerous communication protocols provide with such a redundancy in order to check the integrity of the information transmitted.

In case when this verification is fruitless, the instruction is not executed.

Beside this non-execution of the command, the reception and analysis circuit 22 is laid out to supply to the terminal an acknowledgement of receipt such as a code indicating that the card has indeed received the information and its integrity is correct. Should this not be the case, it sends an error code. Such acknowledgements of receipt are provided in certain communication protocols.

According to the invention, the memory 10 is addressed directly by an address code which is received and analysed by the reception and analysis circuit 22.

Such direct addressing can be done by implementing a protocol known under the abbreviation I2C, a protocol used for running computer peripherals.

This address code is detected by the interpretation and switch circuit 24 which transmits it to the address register 26.

The interpretation and switch circuit 24 also detects the data and instruction codes and transmits them to one or several registers 28, whereas the codes contained in the register 28 are made available to the control circuit 14.

Once the instruction has been carried out, the control circuit 14 is set up to generate a status code indicating that the instruction has been performed or an error code showing that the instruction has not been performed. This code is transmitted to the terminal 18 via the output register 32 receiving the code from the control circuit 14 and from the transmission circuit 34.

When the instruction consists in reading, the code read in the memory is transmitted to the terminal via the output register 32 and the transmission circuit 34.

Obviously, the output register 32 can be in the form of two registers, one for the status codes and the other for the data read in the memory 10.

In the smart card that we have just described, a transaction is carried out with a terminal as follows:

the terminal generates an instruction according to an application programme suited to the smart card according to the invention, whereby this instruction includes at least one instruction code, one address code and one data code, whereas the assembly constitutes a message, the terminal prepares redundancy information such as a parity figure or a redundant cyclic code and introduces the said piece of information into the message composed of the codes to be transmitted, the terminal transmits these codes to the smart card in asynchronous mode via the contacts 16, the reception and analysis circuit 22 validates the message received by the smart card, the reception and analysis circuit 22 transmits an acknowledgement of receipt of the message to the terminal via the transmission circuit while indicating by a code whether the message has been received correctly or not, the control circuit 14 carries out the instruction, and the control circuit 14 transmits to the terminal a message certifying that the instruction has indeed been carried out or has not, via the output register 32 and via the transmission circuit 34.

What is claimed is:

1. A memory card, consisting essentially of:

contacts for communicating with a terminal external to said card;

a memory storing data that is transferred between the card and a terminal;

address and control circuits that control the reading and writing of data from and to said memory;

a signal receiving circuit that receives instruction signals from a terminal, generates messages in response to receipt of the instruction signals, and forwards codes contained within said instruction signals;

an address register associated with said address circuit that stores address codes forwarded by said signal receiving circuit;

a data register that stores control codes and data codes forwarded by said signal receiving circuit;

a detector circuit that receives codes forwarded by said signal receiving circuit and selectively directs said codes to one of said registers;

an output register that receives data read from said memory; and a transmission circuit that supplies data from said output register and messages generated by said signal receiving circuit to said contacts for transmission to a terminal.

2. The memory card of claim 1, wherein said signal receiving circuit determines whether an instruction signal is correctly received, and generates a message indicating whether the instruction signal was correctly received.

3. The memory card of claim 1 wherein said control circuit generates messages indicating the status of an operation performed in response to a control code, and stores said messages in said output register for transmission to a terminal.

4. The memory card of claim 1 wherein said signal receiving circuit and said transmission circuit communicate with a terminal by means of an asynchronous communication protocol.

5. A memory card, comprising:

contacts for communicating with a terminal external to said card;

a memory storing data that is transferred between the card and a terminal;

address and control circuits that control the reading and writing of data from and to said memory; and a data transfer system connecting said contacts to said address and control circuits that transfers data contained within signals received from a terminal to said address and control circuits for storage in said memory, and transfers data read from said memory to said contacts, without using a CPU to effect such transfers.

6. The memory card of claim 5 wherein said address and control circuits cause data to be written to and/or read from an address in said memory that is designated by information contained in signals received from a terminal.

7. The memory card of claim 5 wherein said data transfer system consists essentially of:

a signal receiving circuit that receives instruction signals from a terminal, generates messages in response to receipt of the instruction signals, and forwards codes contained within said instruction signals;

an address register associated with said address circuit that stores address codes forwarded by said signal receiving circuit;

a data register that stores control codes and data codes forwarded by said signal receiving circuit;

a detector circuit that receives codes forwarded by said signal receiving circuit and selectively directs said codes to one of said registers;

an output register that receives data read from said memory; and a transmission circuit that supplies data from said output register and messages generated by said signal receiving circuit to said contacts for transmission to a terminal.

8. The memory card of claim 5 wherein said data transfer system communicates with a terminal by means of an asynchronous communication protocol.

* * * * *